Nov. 16, 1954

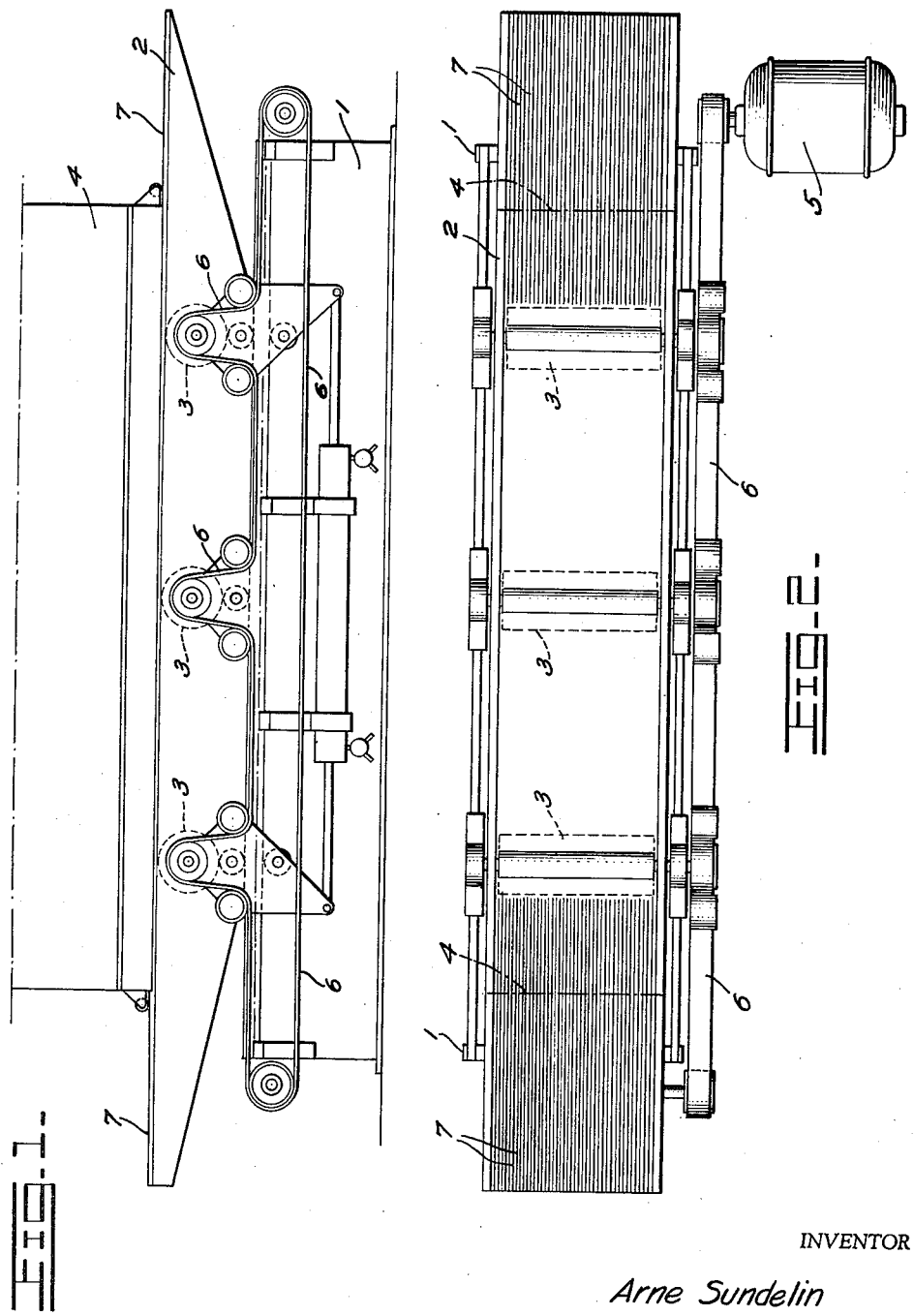

A. SUNDELIN 2,694,531

MACHINE FOR MANUFACTURE OF CHIPS OR SHAVINGS
OF WOOD WASTE AND OTHER WOOD MATERIAL

Filed Jan. 21, 1953

2 Sheets-Sheet 2

INVENTOR
Arne Sundelin

BY Richardson, Davids and Nordon his ATTORNEYS

United States Patent Office 2,694,531
Patented Nov. 16, 1954

2,694,531

MACHINE FOR MANUFACTURE OF CHIPS OR SHAVINGS OF WOOD WASTE AND OTHER WOOD MATERIAL

Arne Sundelin, Nasbypark, Sweden, assignor to Aktiebolaget A. Ekstroms Maskinaffar, Stockholm, Sweden Application January 21, 1953, Serial No. 332,414

1 Claim. (Cl. 241—141)

The present invention relates to an apparatus for the manufacture of chips or shavings of wood waste and other wood material. According to the invention the apparatus comprises a container for the wood material to be treated and a reciprocating table situated below the container, said table being provided with one or more rotatable cutting members driven in a suitable way and being carried by a stand provided with driving means for imparting the reciprocating movement to the table.

Figure 3:
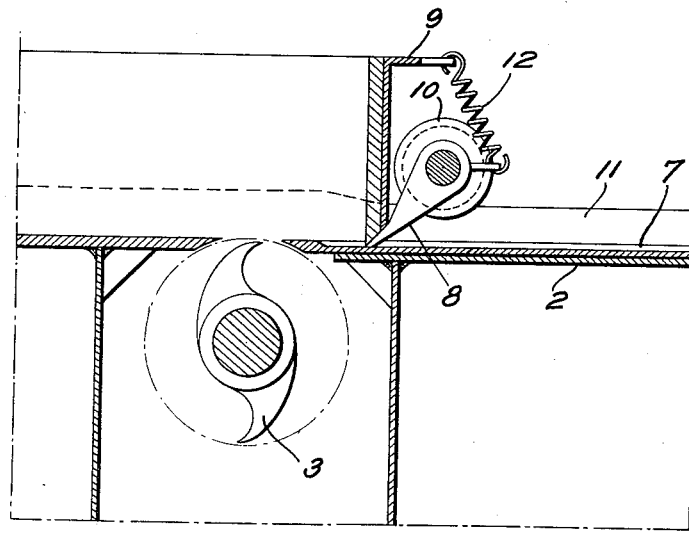
Figure 4:
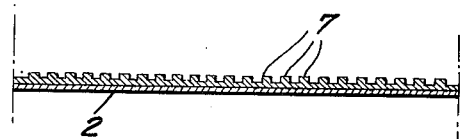

An embodiment of the invention is by way of example illustrated in the accompanying drawing. Fig. 1 is a lateral view of the apparatus in which the container for the material is shown in part. Fig. 2 is a top view in which the container for the material is indicated by two dash and dot lines. Fig. 3 is a longitudinal section on a larger scale of part of the reciprocating table and a cooperating frame situated on the lower part of the container for the material. Fig. 4 is a cross section also on a larger scale of the upper part of the table.

The apparatus consists of a stand 1 on which a reciprocating table 2 is mounted. In the table one or more, e. g. three cutting members 3 are rotatably journalled. Fixed to the stand 1 an elongate container for the wood material to be treated is positioned above the table 2. The container 4 has such an extension in the vertical direction that a required packing height is obtained in order that the wood material by means of its own weight may exert the pressure necessary upon the table 2 and the cutting members 3.

The reciprocating movement of the table 2 may be effected in a known manner by means of driving members situated on the fixed stand 1. Said driving members may consist of hydraulic pistons, transmission gears with forward and reverse coupling and the like.

The cutting members 3 journalled in the table 2 may be driven either via an endless belt 6 common to the cutting members by means of a motor 5 provided in the fixed stand 1 or directly by a motor for each cutting member individually. The cutting members 3 may consist of cutting knives or corresponding members.

In order to prevent thin wedge-shaped pieces of wood from being caught between the ends of the container 4 and the reciprocating table 2, the upper side of the table is provided with a toothed profile 7 comprising alternate ribs and grooves, corresponding to a comb 8 (Fig. 3) situated close to both ends of the container 4. The lower part of the container 4 consists of a frame 9 which by means of rollers 10 rests upon a longitudinal guide 11 (Fig. 3) fixed to the table 2. There are four rollers and each is fixed to an extension projecting from each end corner of the frame, as clearly shown in Figures 1 and 3. The guide is shaped in such a way that the end of the frame 9 will be raised when passing the cutting knife 3. This is accomplished by providing a centrally raised portion on each guide, this portion being slightly greater in length than the distance between the cutting mechanisms at each end of the table, the raised and lower portions of the guide, which serves as a track for the rollers, being joined by a smooth curve, as best shown in Figure 3. The rollers ride on these guides and raise the frame as the cutters 3 approach the rollers at each end of the frame during reciprocation of the table. The comb 8 which is situated outside the frame 9, is pivotally mounted in the frame and is actuated by a spring 12 so that when the frame is raised, the comb will, with its lower part, rest against the table and prevent pieces of wood from entering between the frame 9 and the table 2. The teeth of the comb extend into the grooves between the ribs of the table.

If each cutting knife is driven individually by means of a motor, the two outer cutting knives ought to work in a direction towards the center of the apparatus. By this the oblique load on the driving means is also decreased during the reciprocating movement of the table.

Having now described my invention, what I claim as new and desire to secure by Letters Patent is:

In a machine for reducing wood to pulp having in combination a stationary frame, a reciprocating table movable below said frame and a plurality of spaced cutting mechanisms carried by said table to cut the wood fed into said frame, a guide on said table extending longitudinally thereof on each side of said frame, each guide having a centrally raised portion slightly greater in length than the distance between said spaced cutting mechanisms, a pair of extensions at each end of said frame, a roller fixedly mounted on each extension, said frame being thereby adapted to ride over said guide during the reciprocation of the table to thereby lift the frame over said raised portion as the cutters approach the rollers at each end of the frame; said table having a longitudinally ribbed and grooved surface at each end of the frame, a comb pivotally mounted between said extensions and carried thereby, said comb being yieldingly supported in contact with said table, the teeth of said comb extending into grooves between said ribs across the width of said table to prevent the accumulation of chips between said frame and said table during reciprocation thereof.

References Cited in the file of this patent

UNITED STATES PATENTS

| Number | Name | Date |
|---|---|---|
| 1,795,064 | Wiener | Mar. 3, 1931 |
| 2,442,492 | Hassler | June 1, 1948 |